UNITED STATES PATENT OFFICE.

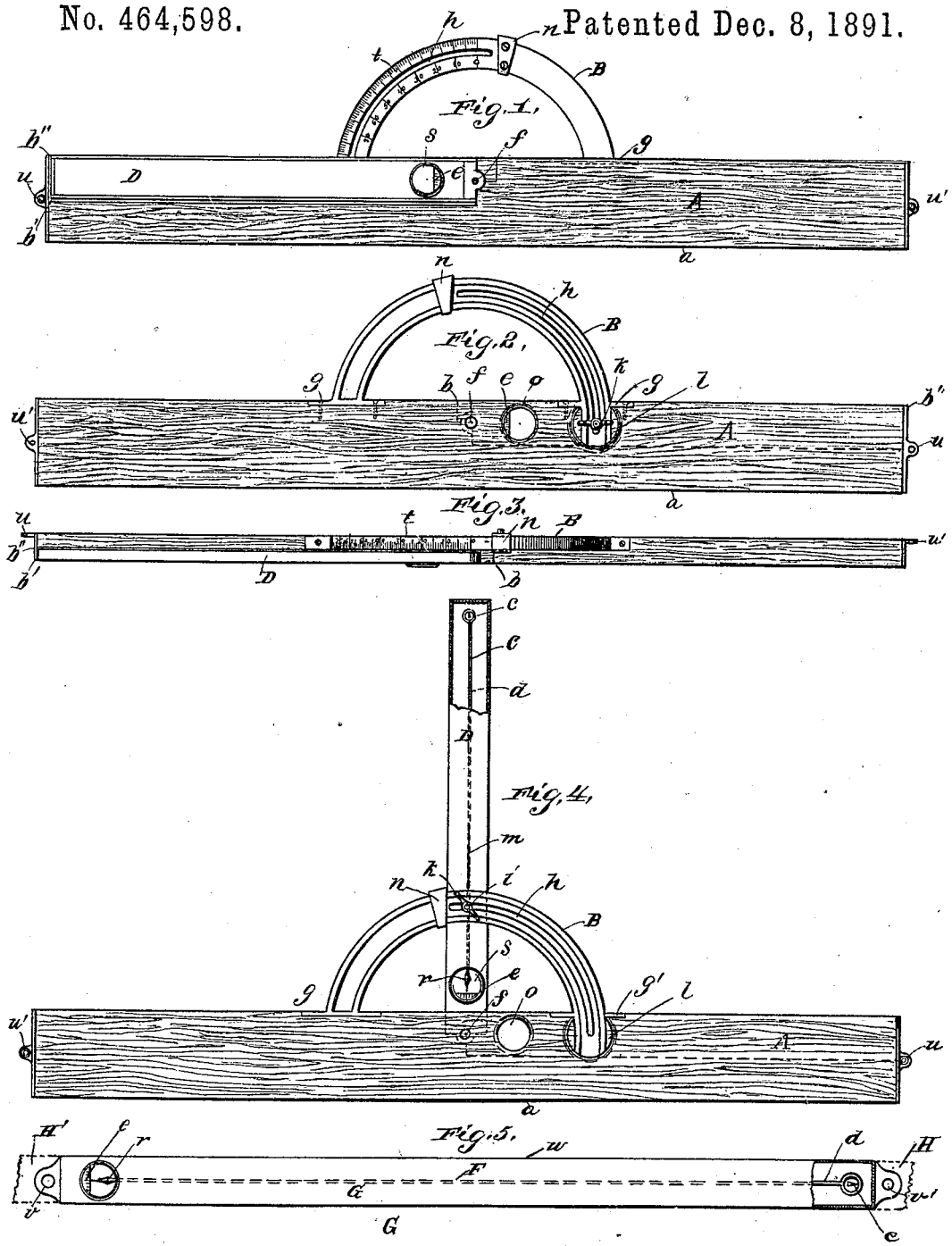

JAMES T. WELTON, EDWIN B. ANDRUS, AND JULIEN M. PINE, OF EVANSTON, ILLINOIS.

PLUMB AND LEVEL.

SPECIFICATION forming part of Letters Patent No. 464,598, dated December 8, 1891.

Application filed April 13, 1891. Serial No. 388,804. (No model.)

*To all whom it may concern:*

Be it known that we, JAMES T. WELTON, EDWIN B. ANDRUS, and JULIEN M. PINE, citizens of the United States, residing at Evanston, in the county of Cook and State of Illinois, have invented a certain new and useful Combined Level and Plumb and Interindicator, of which the following is a specification.

Our invention relates to an improvement in a level and plumb used by carpenters, builders, and masons, wherein the usual spirit-tubes are dispensed with and the level or plumb is indicated by a pendulum vibrating to a scale, and also the instrument can be used to indicate or find any angle or direction between the level and a perpendicular for the purpose especially of determining the pitch of rafters and roofs of buildings and of inclined walls. We attain these objects by the mechanism illustrated in the accompanying drawings.

Figure 1 is a view of the front side of the level and plumb. Fig. 2 is a back view of the same. Fig. 3 is a top view. Fig. 4 is a back view, wherein the pendulum and case are raised to right angles with the body of the instrument. Fig. 5 is a view of an elongated pendulum and case.

Similar letters refer to similar parts throughout.

The instrument is made up of three general parts—the body A, the half-circle B, and the pendulum C, with its case D.

The body A is a piece of wood or other material having a true lower edge $a$, and is much the same as the body of the usual spirit-level. About an eighth part of this body, from $b$ to $b'$ $b''$, Figs. 1 and 3, is cut away to permit the pendulum-case D to lie therein. A notch or hole $o$ is made in the body A at such a place that the scale or point $e$ and pendulum-point $r$, when the pendulum-case D is closed with the body A, may be seen. The pendulum-case D is made of some suitable material, as brass, to contain the pendulum C, which is hung at its upper end upon the knife-edged or V-shaped pin $c$, Fig. 4. The pendulum consists of a simple rod $d$, hung by a loop or other bend upon the pin $c$, as described above, while the lower end is brought to a point $r$ and is free to vibrate over or by the scale $e$. The lower end of the case C is secured to the body A by the axial pin $f$. When properly made, the middle of the scale or the point $e$ and the pins $c$ and $f$ will be in straight alignment. The lower end of the case D has a hole $s$, enabling the pendulum-point $r$ and scale $e$ to be viewed. This hole may be covered with glass set in a bezel or otherwise secured.

The half-circle B, made of brass or other suitable material, is secured to the body A by some common means; and, conveniently, by screws through the flanges or shoulders $g$ $g'$, and has the pin $f$ as its center. This half-circle B is provided with a slot $h$, adapted to pass the pin or projection $i$. This pin $i$ is secured solidly to the case D and is provided with a set-screw $k$, by which the case D can be placed at any angle up to ninety degrees with the body A, and there secured. The slotted end of the half-circle B extends down sufficiently far to allow the pendulum-case D to close into the body A, and a portion of the body A, as at 1, Figs. 2 and 4, is cut away to give room for the thumb and finger to operate the set-screw $k$. This half-circle B is graduated upon the top edge or back side, or both, with a scale $t$ up to ninety degrees, with sufficient numerals to enable the user of the instrument to set the pendulum-case D at any desired angle with the body A by bringing the line $m$ upon the back of the case to the proper mark upon the scale. A shoulder or stop $n$ is provided at such a position upon the half-circle B that when brought to it the case D and body A will be at right angles. This stop $n$ may be secured by screws or a set-screw, so that in case of wear of it or the case D at the point of contact therewith it may be adjusted.

When desired to be used as a plumb, the case D is set and closed with the body A, as shown in Figs. 1 and 2. The instrument then being held perpendicularly or the edge $a$ of the body A being brought to the object to be plumbed, the plumb is quickly found upon the point $r$ coming to rest at the proper center of the scale or the point $e$. Although the pendulum swings easily, it is practically and quickly brought to rest at the correct point by slightly tilting the instrument to bring the pendulum against the front or back of the case D and momentarily freeing it again.

When it is desired to use the instrument to determine some other angle between the horizontal and the perpendicular, as in giving the desired pitch to roofs and rafters, or in laying slanting walls or converging chimneys and the like, the line m upon the back of the case D is brought to the proper degree, as marked on the scale t of the half-circle B, and there secured by the set-screw k. Then when the straight-edge is applied to the wall or rafter or brought to such a position that the pendulum-point r will pause at the center of the scale or the point e the desired pitch will be shown by the direction of the edge a. When to be used as a level, the case D is set at right angles to the body A, and when the pendulum-point r rests at the middle of the scale or the point e the body A will be in a horizontal or level position.

The instrument may be secured by screws or bolts, through the ears u u' of the body A, to a long straight-edge, to be used in leveling floors, taking the plumb of joists, and the like.

As shown in Fig. 5, the pendulum and case may be made of considerable length, as F and G, with perforated lobes v v' at either end, and by which such case may be secured by screws or bolts to a long straight-edge H H', said straight-edge being shown broken and in part by dotted lines in said Fig. 5 for use in finding the perpendicular of long timbers, as studding, or of walls and the like. At least one edge, as w, of the case G is engine-turned or made true, so as to be parallel to a straight line projected through the points e and c.

What we claim, and desire to secure by Letters Patent, is—

1. The combination, in a level and plumb, of the body A, recessed or cut away to receive the case D and having a notch or hole o adapted to coincide with the hole in said case when the latter is folded into the body A, the case D, having the pendulum C hung therein by the pin c and having the scale or point e and also the pin i and set-screw k, the half-circle B, with scale thereon, having the slot h and stop n, all substantially as set forth.

2. The combination, in a plumb and level, of the body A, adapted to receive the case D when folded thereto and having the notch or hole o, the case D, adapted to contain and hold the pendulum C and having the scale or point e and carrying the pin and set-screw i and k, the said pendulum, and the half-circle B, having the slot h, all substantially as set forth, for the purpose specified.

3. As a new article of manufacture, a combined level and plumb consisting of a body A, adapted to receive a pendulum-case D when folded with it, said pendulum-case containing a pendulum and a point or scale to which such pendulum will vibrate, and a half-circle B, adapted and having means to hold said case at any desired angle to said body A, substantially as shown and described.

JAMES T. WELTON.
EDWIN B. ANDRUS.
JULIEN M. PINE.

Witnesses:
ORLANDO F. GIBBS,
JAMES T. WELTON, Jr.